(12) United States Patent
Lambert

(10) Patent No.: US 8,746,074 B2
(45) Date of Patent: Jun. 10, 2014

(54) STRAIN SENSING CABLE

(75) Inventor: Christopher H. Lambert, Blacksburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/483,694

(22) Filed: May 30, 2012

(65) Prior Publication Data

US 2013/0319126 A1 Dec. 5, 2013

(51) Int. Cl.
*G01B 5/30* (2006.01)
*G01B 7/16* (2006.01)
*G01L 1/00* (2006.01)
*G01N 3/00* (2006.01)

(52) U.S. Cl.
USPC ............ 73/760; 73/152.48; 73/152.49

(58) Field of Classification Search
USPC ................. 73/760, 152.48, 152.49
See application file for complete search history.

(56) References Cited

U.S. PATENT DOCUMENTS

| | | | | |
|---|---|---|---|---|
| 3,958,455 | A | * | 5/1976 | Russell ............... 73/862.68 |
| 4,488,040 | A | * | 12/1984 | Rowe ............... 250/227.14 |
| 4,803,888 | A | * | 2/1989 | Choquet ............ 73/862.392 |
| 5,586,839 | A | * | 12/1996 | Gillespie ............ 405/259.1 |
| 5,929,341 | A | * | 7/1999 | Bawden et al. ........... 73/784 |
| 6,311,564 | B1 | * | 11/2001 | Martin et al. ............. 73/787 |
| 2004/0258373 | A1 | | 12/2004 | Andreassen |
| 2009/0034903 | A1 | * | 2/2009 | Herbst ..................... 385/13 |
| 2010/0290733 | A1 | * | 11/2010 | Xia et al. ................. 385/12 |
| 2011/0058778 | A1 | | 3/2011 | Herbst |
| 2012/0073804 | A1 | * | 3/2012 | Harman et al. ...... 166/250.01 |
| 2012/0082422 | A1 | * | 4/2012 | Sarchi et al. ............. 385/101 |
| 2012/0125596 | A1 | * | 5/2012 | Homa et al. .............. 166/66 |
| 2012/0174683 | A1 | * | 7/2012 | Kemnitz et al. .......... 73/800 |
| 2013/0034324 | A1 | * | 2/2013 | Laing et al. ................ 385/13 |

FOREIGN PATENT DOCUMENTS

| | | | | |
|---|---|---|---|---|
| JP | 2000075174 A | * | 3/2000 | ........ G02B 6/44 |
| WO | WO 2010136062 A1 | * | 12/2010 | ........ H01B 7/32 |
| WO | 2012044947 A1 | | 4/2012 | |

OTHER PUBLICATIONS

AFL—Specialty Fiber Optic Cable [oline]; [retrieved on Jul. 18, 2012]; retrieved from the Internet http://www.aflglobal.com/Products/Fiber-Optic-Cable/Downhole/Traditional/Traditional_Downhole_Cable.aspx, "Traditional Downhole Cable," © 2008-2011, AFL, 1p.

Notification of Transmittal of the International Search Report and the Written Opinion of the International Searching Authority, or the Declaration; PCT/US2013/038216; Aug. 23, 2013.

* cited by examiner

*Primary Examiner* — Lisa Caputo
*Assistant Examiner* — Jamel Williams
(74) *Attorney, Agent, or Firm* — Cantor Colburn LLP

(57) ABSTRACT

A sensing cable, including an outer cladding; and at least one sensing bundle contained within the cladding, each sensing bundle having a sensing fiber wrapped strain-transmissively by at least one strand. A method of sensing strain is also included.

20 Claims, 2 Drawing Sheets

STRAIN SENSING CABLE

BACKGROUND

Cables, particularly fiber optic cables, are used ubiquitously in the downhole drilling and completions industry. These cables are used for enabling a variety of downhole conditions and parameters, such as temperature, vibration, sound, pressure, strain, etc. to be monitored. Due chiefly to their pervasive use, there is an ever-present desire in the industry for alternate styles of sensing cables, particularly for enhancing the ability to more accurately sense a specific parameter such as strain.

SUMMARY

A sensing cable, including an outer cladding; and at least one sensing bundle contained within the cladding, each sensing bundle having a sensing fiber wrapped strain-transmissively by at least one strand.

A method of sensing strain including deploying a cable having at least one at least one sensing bundle contained within a cladding, each sensing bundle having a sensing fiber wrapped strain-transmissively by at least one strand; and transmitting strain to the fiber via the at least one strand.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
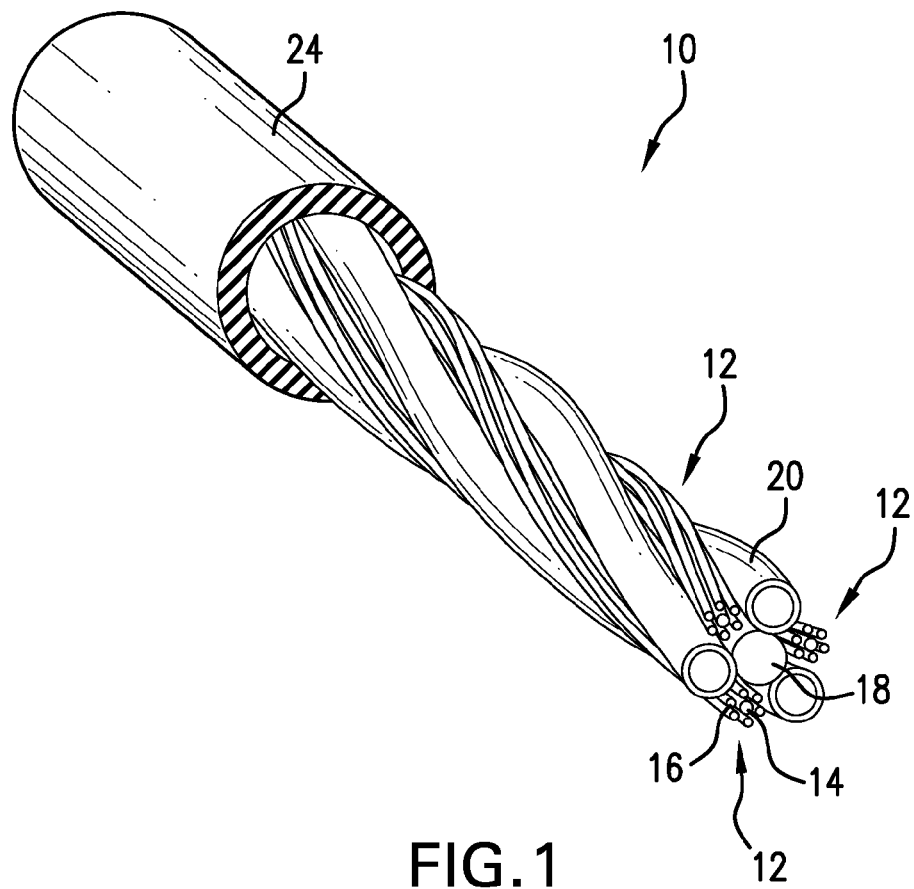
FIG. 1 is a prospective view of a strain-sensing cable according to an embodiment disclosed herein with a cladding partially stripped off.

Referring now to FIG. 1, a cable assembly 10 is illustrated. The assembly 10 includes at least one braid or bundle 12 for improving a strain-sensing capability of the cable 10. Specifically, each of the bundles 12 includes a fiber 14 that is wrapped with or surrounded by a plurality of strands 16. The fibers 14 are arranged for sensing one or more downhole conditions or parameters such as temperature, pressure, strain, acoustics, etc. In one embodiment, the fibers 14 are optical fibers. In a further embodiment, the fibers 14, in the form of optical fibers, include fiber Bragg gratings for enabling the aforementioned sensing capabilities.

The strands 16 are included to facilitate the transfer of strain directly to the fibers 14 so that the cable 10 can be used, e.g., to measure strain in a tubular string or downhole component. To this end, the strands 16 are wrapped, wound, or secured, e.g., helically, spirally, circumferentially, etc., about each of the fibers 14. The number of the strands 16 and the number of turns of the strands 16 per unit length of the fibers 14 may vary in different embodiments. In one embodiment, the strands 16 are stainless steel, although it is to be appreciated that other materials can alternatively be used that exhibit good strain transfer capabilities (e.g., resiliency, ductility, etc.) and resistance to downhole conditions (e.g., maintain good strain transmission to the fibers 14 in high temperature or high pressure environments, etc.).

Similar to the strands 16 being wrapped or wound about the fibers 14 in each of the bundles 12, the bundles 12 in the embodiment of FIG. 1 are wrapped or wound, e.g., helically, spirally, circumferentially, etc., about a core or central wire 18. The gauge, material, properties, etc. of the central wire 18 can be selected for setting the properties of the cable 10, such as ductility, flexibility, conformability, radial compression strength, tensile strength, etc. In the illustrated embodiment, the bundles 12 are interspaced about the central wire 18 with a plurality of tubes 20. It should of course be appreciated that the tubes 20 could be optional in some embodiments and that any number of the tubes 20 and the bundles 12 could be included in any desired arrangement or pattern (e.g., a sequence that is alternating/non-alternating, repeating/non-repeating, randomized, etc.). An internal passageway through ach of the tubes 20 enables, e.g., one or more sensing fibers 22 (e.g., resembling the fibers 14 but without the strands 16) to be located within the tubes 20 for sensing a variety of non-strain related properties (e.g., temperature, pressure, acoustics, etc.). In one embodiment, the tubes 20 and the sensing fibers forming assemblies according to known fiber in metal tube (FIMT) techniques by sealing one or more fibers resembling the fibers 22 within the tubes 20. According to known FIMT techniques, the tubes 20 may be filled with a gel or fluid to aid in the operation of the tubes 20 and/or the cable 10. It is additionally noted that the tubes 20 also play a role in setting the properties and performance of the cable 10, for example, by increasing the compressive strength of the cable 10 in order to avoid the cable 10 collapsing in high pressure downhole applications. It is to be appreciated that ones of the tubes 20 could be replaced with solid wires resembling the central wire 18, that the central wire 18 could be hollow and resemble one of the tubes 20, or other modifications could be made to the cable 10.

The cable 10 includes a cladding or sheath 24 to further protect and set the properties of the cable 10 as well as to maintain the assembled arrangement of the components (e.g., to maintain the strands 16, bundles 12, and tubes 20 being wrapped around their corresponding components). Additionally, a cavity 26 formed by the empty space within the cladding 24 located between the bundles 12, the central wire 18, and/or the tubes 20, can be filled with a polymer or other filler material, e.g., for achieving the aforementioned objectives of the cladding 24. In one embodiment the filler material in the cavity 26 is a plastic elastomer, such as that marketed under the trade name Hytrel® and made commercially available from E. I. du Pont de Nemours and Company (DuPont).

Figure 2:
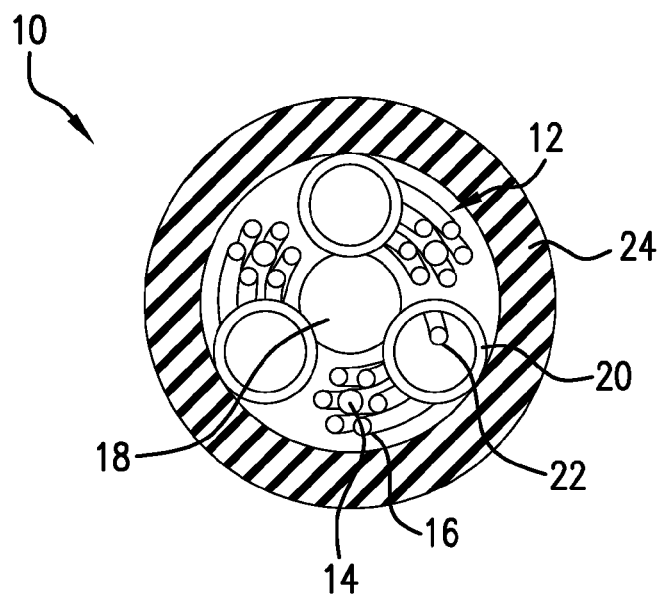
FIG. 2 is a cross-sectional view of the cable of FIG. 1.
Figure 3:
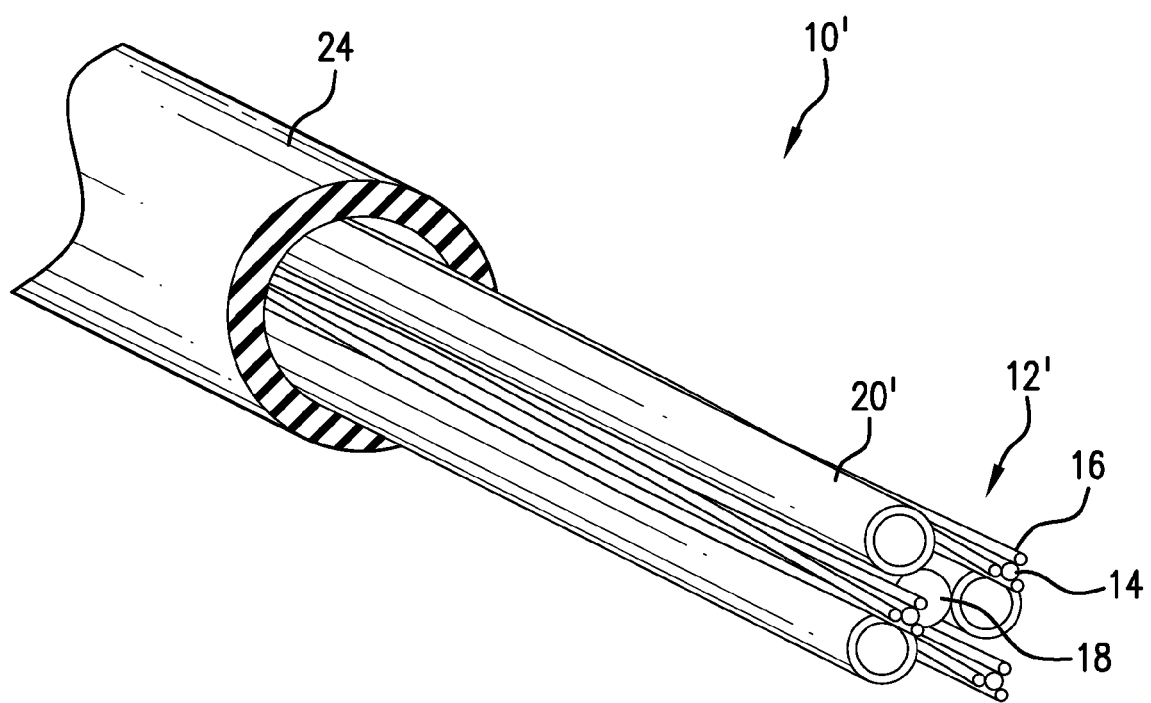
FIG. 3 is a prospective view of a strain-sensing cable according to another embodiment disclosed herein.

An alternate embodiment is illustrated in FIG. 3, namely, a cable 10'. The components of the cable 10' generally resemble those in the cable 10 and have thus been numbered in accordance with the above-discussed embodiment where appropriate. While the bundles 12 are spirally wrapped in the cable 10, a plurality of bundles 12' in the cable 10' extends axially within the cladding 24 in a non-spiraling manner (but otherwise resemble the bundles 12). A plurality of tubes 20' are also shown extending axially in a non-spiraling manner, but otherwise resemble the tubes 20 discussed above. For example, the bundles 12' and/or the tubes 20' in the cable 10' may extend straight along the central member 18, in parallel with the central member 18, concentrically with the cladding 24 in lieu of the central member 18, etc. It is noted that a cross-section of the cable 10' would generally resemble the illustration of FIG. 2. The cable 10' may have particular benefits, for example, in a shape-sensing application in which strain measurements by the fibers 14 are utilized in calculating or determining the shape of a component about or with which the cable 10 is installed.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A sensing cable, comprising:
   an outer cladding;
   a central member disposed in the outer cladding; and
   at least one sensing bundle contained within the cladding, each sensing bundle having a sensing fiber wrapped strain-transmissively by at least one strand.

2. The sensing cable of claim 1, the at least one bundle being circumferentially wrapped about the central member.

3. The sensing cable of claim 1, wherein the at least one bundle extends axially and non-spirally within the outer cladding.

4. The sensing cable of claim 3, wherein the at least one bundle extends in parallel with the central member.

5. The sensing cable of claim 1, further comprising a filler material in the cladding encapsulating the at least one sensing bundle.

6. The sensing cable of claim 5, wherein the filler material is a plastic.

7. The sensing cable of claim 1, further comprising at least one tube disposed in the outer cladding.

8. The sensing cable of claim 7, wherein the tube includes at least one additional sensing fiber located therein.

9. The sensing cable of claim 8, wherein the tube and the at least one additional sensing fiber form a fiber in metal tube (FIMT) assembly.

10. The sensing cable of claim 7, wherein the at least one tube and the at least one sensing bundle are included about a central member.

11. The sensing cable of claim 10, wherein the central member is a wire.

12. The sensing cable of claim 10, wherein the at least one tube comprises a plurality of tubes and the at least one sensing bundle comprises a plurality of sensing bundles.

13. The sensing cable of claim 12, wherein the sensing bundles and the tube are alternatingly included about the central member.

14. The sensing cable of claim 12, wherein the sensing bundles and the tubes are circumferentially wrapped about the central member.

15. The sensing cable of claim 1, wherein the fiber includes fiber Bragg gratings.

16. A method of sensing strain comprising:
    deploying a cable having at least one at least one sensing bundle contained within a cladding, each sensing bundle having a sensing fiber wrapped strain-transmissively by at least one strand, each of the sensing bundles being wrapped circumferentially about a central wire; and
    transmitting strain to the fiber via the at least one strand.

17. The method of claim 16, further comprising sensing strain in the fiber by use of fiber Bragg gratings.

18. The method of claim 16, wherein the cable further comprises at least one tube in the cladding.

19. The method of claim 18, wherein the at least one tube includes at least one other fiber disposed therein.

20. The method of claim 19, further comprising monitoring an additional condition or parameter with the at least one other fiber.

* * * * *